Jan. 27, 1970　　　J. F. MACKOWIAK　　　3,491,734
SPEED CONTROL FOR INTERNAL COMBUSTION ENGINES
Filed March 27, 1968　　　2 Sheets-Sheet 1
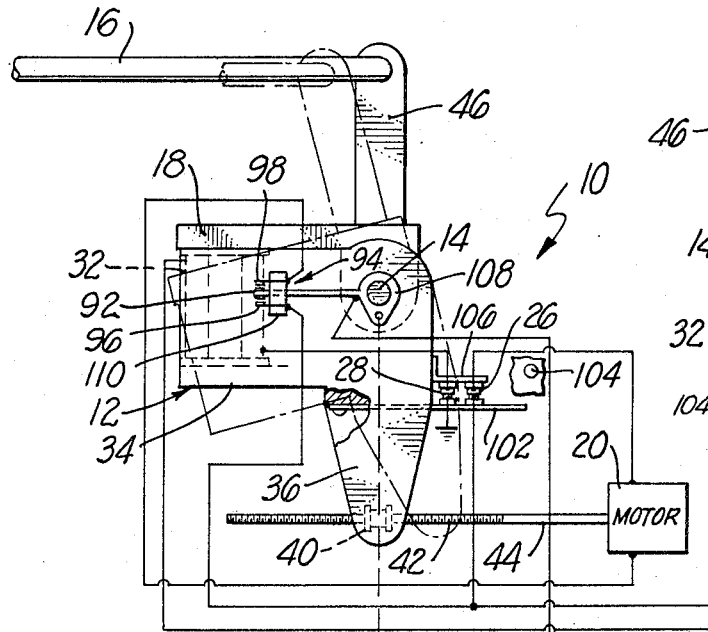
Fig. 1.
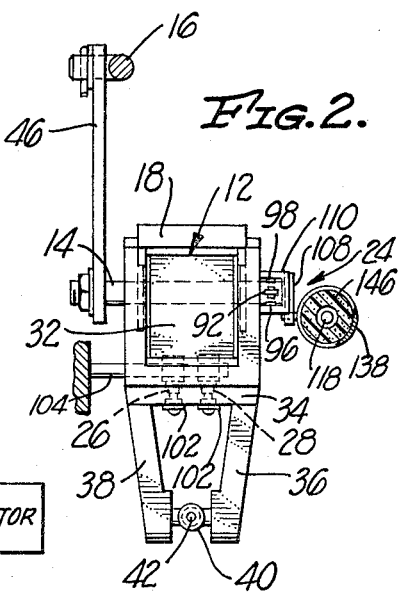
Fig. 2.
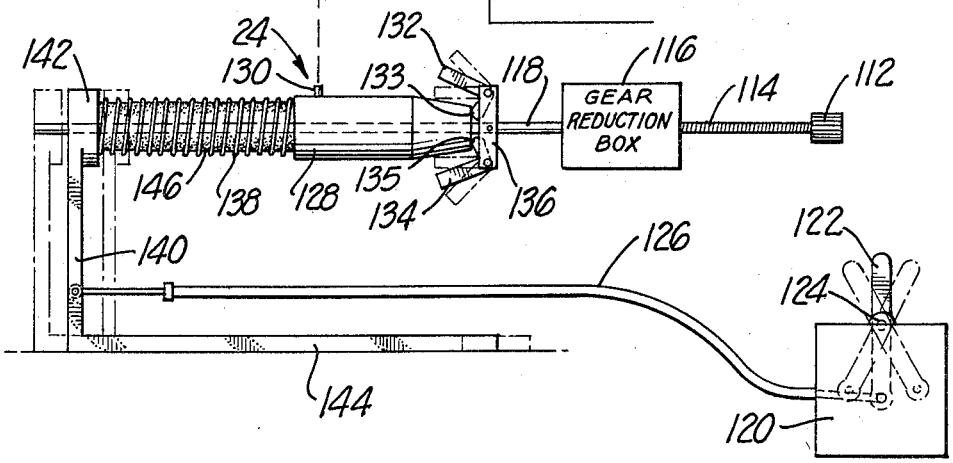
INVENTOR
JAMES F. MACKOWIAK
BY HIS ATTORNEYS
HARRIS, KIECH, RUSSELL & KERN

United States Patent Office 3,491,734
Patented Jan. 27, 1970

3,491,734
SPEED CONTROL FOR INTERNAL
COMBUSTION ENGINES
James F. Mackowiak, Arcadia, Calif., assignor to Associated Western Enterprises, Alhambra, Calif., a partnership
Filed Mar. 27, 1968, Ser. No. 716,580
Int. Cl. F02d *11/10*
U.S. Cl. 123—102                    7 Claims

ABSTRACT OF THE DISCLOSURE

Apparatus for automatically regulating the operating speed of an engine to predetermined values independent of changes in engine load and including a reversible control motor selectively connectible to the throttle of the engine by an electromagnet assembly, and circuit means in series with the motor and electromagnet assembly for limiting the value of the engine's operating speed while under the control of the motor and for immediately halting control of the engine's speed by the motor upon de-energization of the circuit means.

---

The present invention relates to improvements in engine speed control systems and, more particularly, to an improved apparatus for regulating the operating speed of the vehicle's engine while driving auxiliary equipment through a power take-off from the engine.

Today, various forms of trucks include power take-off units for driving auxiliary equipment such as wenches, hoists, drums, pumps, and compressors from the engine of the truck. In such trucks, the power take-off unit is commonly connected to the transmission and is energized by placing the transmission in neutral gear and by shifting a power take-off lever to engage the power take-off unit. Thereafter, the rotational output of the engine is transferred through the power take-off unit to the auxiliary equipment.

After the power take-off unit is engaged, and after auxiliary equipment is connected therethrough to the engine, the load applied to the engine may vary over a wide range under varying operating conditions. Often, it is desired to maintain a uniform operating speed for the engine under such varying load conditions. In the past, this has required a workman in the cab of the truck to visually monitor the operating speed of the engine and to maintain continuous control of the speed of the engine as by continuous manual control of the accelerator pedal connected to the throttle for the engine.

In practice, it is quite taxing upon a workman to maintain such constant visual and manual control over engine speed particularly when the load on the engine is of a fluctuating nature. Moreover, such visual and manual control by the workman does not usually result in desired constancy of engine speed. In addition, the requirement that a workman remain in the cab to provide continuous engine speed control necessitates the use of an extra man on the truck for this specific purpose, other men being required to monitor the operation of the auxiliary equipment and to function in conjunction therewith.

In many instances, the auxiliary equipment connected to the engine through the power take-off unit is susceptible of damage if driven at excessive speed. In practice, the visual and manual control by the workman, particularly under fluctuating load conditions, often allows the engine to reach such excessive speeds thereby seriously damaging the auxiliary equipment.

In view of the foregoing, it is an object of the present invention to provide means for automatically regulating the operating speed of an engine closely about predetermined values independent of the changes in the load applied thereto through a power take-off unit. In this manner, the present invention eliminates the need for an extra workman to visually monitor and manually control engine speed and reduces the chances of auxiliary equipment damage due to excessive engine operating speed.

Another object of the present invention is to provide improved apparatus of the foregoing character including a reversible control motor selectively connectible to the throttle of the engine by an electromagnet assembly together with circuit means in series with the motor and the electromagnet assembly for limiting the value of the engine's operating speed while under the control of the motor and for immediately halting control of the engine speed by the motor upon de-energization of the circuit means.

The foregoing as well as other objects and advantages of the present invention may be more clearly understood by reference to the following detailed description when considered with the drawings which, by way of example only, illustrate an engine speed regulating apparatus including the novel features of the present invention.

In the drawings:

FIG. 1 is a diagrammatic representation of the mechanical portion of the engine speed regulating apparatus;

FIG. 2 is a fragmentary side view of a portion of the apparatus illustrated in FIG. 1.

Figure 3:
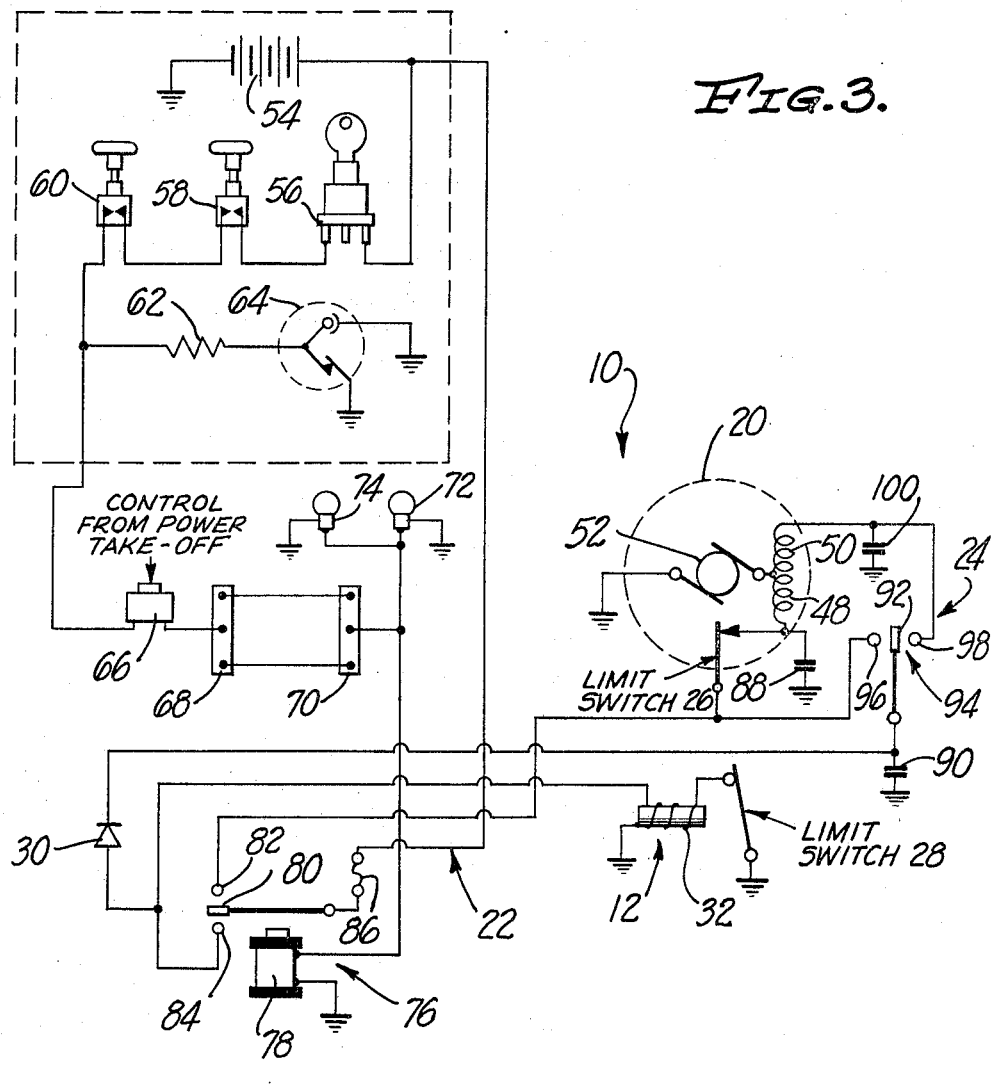
FIG. 3 is a wiring diagram of the electrical circuitry for the apparatus illustrated in FIG. 1.

Generally speaking, the engine speed rgeulating apparatus of the present invention is designed to operate in conjunction with and upon engagement of a power take-off unit for a vehicle's engine and functions to automatically maintain the operating speed of the engine at or closely about a predetermined speed independent of changes in the load on the engine. Neither the engine nor the power take-off unit is illustrated specifically in the drawings. However, they may take any one of a number of different conventional forms. For this reason, it is to be understood that the invention described herein is not limited to a combination including any one specific type of engine or power take-off unit.

In the drawings, the engine speed regulating apparatus is represented generally by the numeral 10 and comprises an electromagnet assembly 12. The electromagnet assembly is mounted for free turning on a rocker shaft 14 to selectively control the movement of a throttle linkage rod 16 through a lock arm 18 connected to the rocker shaft, the throttle linkage rod being associated with the throttle for the engine and controlling the operating speed of the engine upon movement thereof. The swinging movement of the electromagnet assembly 12 is under the control of a reversible control motor 20 the operation of which is regulated by a circuit means 22 and means 24 for comparing the operating speed of the engine with a predetermined and desired speed for the engine.

In brief, if the operating speed of the engine exceeds the predetermined speed, the reversible motor 20 is controlled to swing the electormagnet assembly 12 in a direction which will reduce the speed of the engine through operation of the throttle linkage rod 16. The reverse operation occurs if the operating speed of the engine is less than the predetermined speed.

In the circuit means 22 for controlling and energizing the motor 20, limit switches 26 and 28 are connected in series with the motor and with the electromagnet assembly 12 for automatically opening before the speed of the engine reaches a value which might damage the auxiliary equipment connected to the engine through the power take-off unit. Also, the circuit means 22 includes a diode 30 in series with the motor 20 to insure that when the circuit means is de-energized, the motor will not automatically drive the engine to a maximum speed condition which might otherwise damage the auxiliary equipment.

More particularly, and as illustrated most clearly in FIGS. 1 and 2, the electromagnetic assembly 12 comprises a solenoid 32 carried by a yoke 34. The rocker shaft 14 extends laterally through and supports the yoke 34 for free swinging movement thereon with the axis of the solenoid 32 normal to the axis of the rocker shaft. As previously indicated, the swinging movement and hence the rotational position of the electromagnet assembly 12 on and relative to the rocker shaft 14 is controlled by the motor 20. In this regard, a pair of laterally spaced legs 36 and 38 of the yoke 34 extend radially from the rocker shaft 14. An internally threaded collar 40 is pivotally secured to and between the outer ends of the legs 36 and 38 and receives a lead screw 42 or threaded portion of a drive shaft 44 of the motor 20. Thus arranged, a turning of the drive shaft 44 in a first direction produces a counterclockwise swinging of the yoke 34 on the rocker shaft 14 while a turning of the drive shaft in a second direction produces a swinging of the yoke in a clockwise direction. As will be described in detail hereinafter, the direction of rotation of the drive shaft 44 is controlled by operation of the comparison means 24 in conjunction with the circuit means 22.

In addition to the electromagnet assembly 12, the rocker shaft 14 supports the lock arm 18 and a connecting arm 46. The lock arm 18 is formed of a metal material, is fixedly connected to the rocker shaft, and extends radially therefrom over and adjacent the upper surface of the electormagnet assembly, when viewed in FIGS. 1 and 2. Thus, when the solenoid 32 is energized by the circuit means 22, the lock arm 18 is attractable toward and lockable against the electormagnet assembly. Once the lock arm 18 is thus secured to the electormagnet assembly 12, turning of the rocker shaft 14 is controlled by swinging movement of the electormagnet assembly under the control of the motor 20.

The connecting arm 46 is fixedly connected at one end to the rocker shaft 14 and extends radially therefrom for pivotal connection to an end of the throttle linkage rod 16. Thus, when the lock arm 18 is secured to the electromagnet assembly 12, swinging movement of the electromagnet assembly under control of the motor 20 produces longitudinal movement of the throttle linkage rod 16 through the connecting arm 46 to control the operating speed of the engine.

As illustrated most clearly in FIG. 3, the motor 20 is preferably a series motor including an armature connected to the drive shaft 44 and a pair of field windings 48 and 50 each connected in series with the armature winding 52 for the motor to ground. The motor is designed such that current flow through the field winding 48 and armature winding 52 produces a turning of the drive shaft 44 in the first direction while current flow through the field winding 50 and armature winding 52 produces a turning of the drive shaft 44 in the second direction. The direction of current flow through the field windings is under the control of the comparison means 24 and circuit means 22 in conjunction with the electrical circuitry of the truck engine.

In FIG. 3, the electrical circuitry for the truck engine is set off within a broken line rectangle and includes a battery 54 for the engine connected in series with an ignition switch 56 and a pair of manually operable safety switches 58 and 60. The safety switches in turn are connected in series with a ballast resistor 62 and the distributor 64 for the engine.

The circuit means 22 is connected to the electrical circuitry for the truck engine and includes a power take-off switch 66, a pair of parallel connected console switches 68 and 70, a pair of console lamps 72 and 74, a relay 76, and the diode 30 connected to the electrical portion of the comparison means 24 and the motor 20.

The power take-off switch 66 is connected in series with the ignition switch 64, and is mechanically closed by operation of the lever in the power take-off unit to engage the power take-off unit.

The pair of parallel switches 68 and 70 are preferably stationed in consoles on opposite sides of the truck to permit the circuit means 22 to be energized by a workman on either side of the truck.

The lamps 72 and 74 are connected in series with the parallel switches 68 and 70 and provide a visual indication that the circuit means 22 is energized.

The relay 76 includes a coil 78, a movable contact 80, and a pair of fixed contacts 82 and 84. The coil 78 is connected to ground and to the battery 54 through the parallel console switches 68, 70, power take-off switch 66 and ignition switch 56. The movable contact 80 is connected to the battery 54 through a fuse 86 which protects the circuit means 22 from damage due to over currents. The fixed contact 82 is connected in series with the limit switch 26 and the field winding 48 for the motor, the limit switch also being connected to an AC bypass capacitor 88 to ground. The fixed contact 84, on the other hand, is connected to the solenoid 32 of the electromagnet assembly in series with the limit switch 28 to ground as well as to the anode of the diode 30, the cathode of which is connected in common through an AC bypass capacitor 90 to ground and to a movable switch arm 92 for a control switch 94 comprising the electrical portion of the comparison means 24.

In addition to the movable switch arm 92, the control switch 94 includes a pair of fixed contacts 96 and 98 on opposite sides of the movable switch arm. The movable switch arm 92 is mechanically movable between the contacts 96 and 98 under the control of the mechanical portion of the comparison means 24 as illustrated most clearly in FIG. 1. The contact 96 is connected in series with the limit switch 26 and the field winding 48 for the motor while the contact 98 is connected by an AC bypass capacitor 100 to ground and to the field winding 50 in series with the armature winding 52 for the motor 20.

Considering the circuitry set forth in FIG. 3, the operation of the engine speed regulating apparatus 10 is as follows: The movable contact 80 of the relay 76 engages the fixed contact 82 when the relay is de-energized. Therefore, current normally flows from a battery 54 through the relay 76, the limit switch 26, and the field winding 48 in series with the armature winding 52 to ground. As previously indicated, such current flow causes the drive shaft 44 of the motor 20 to turn in a first direction swinging the electromagnet assembly 12 in a counterclockwise direction. Since the electromagnet assembly is not energized, the yoke 34 separates from the lock arm 18 and swings freely on the rocker shaft 14 in a counterclockwise direction, thus permitting free and uninhibited movement of the throttle linkage rod 16 without interference from the electromagnet assembly. As the yoke 34 swings in a counterclockwise direction, and as most clearly illustrated in FIG. 1, an arm 102 cantilevered from the base of the yoke engages a stationary stop member 104 here illustrated as comprising a rod extending from a reference structure such as the housing for the apparatus 10. The cantilevered arm 102 carries the movable switch arms of the limit switches 26 and 28, the stationary contacts of which are supported by an arm 106 extending from the right side of the yoke. As the cantilevered arm 102 engages the stop 104, the movable contacts of the limit switches 26 and 28 separate from the fixed contacts to open the limit switches. As this occurs, current flow from the battery 54 through the relay 76 and hence to the field winding 48 is terminated to halt operation of the motor 20. This defines the normal position of the electromagnet assembly 12 prior to energization of the circuit means 22, the motor 20 being de-energized and the electromagnet assembly being removed from the lock arm 18 to permit free movement of the throttle linkage rod 16 as by manual control of the truck's accelerator pedal during normal road driving conditions.

When it is desired to utilize the engine to drive auxiliary equipment, the transmission of the engine is placed in neutral gear with the engine running. The lever on the power take-off unit is then moved to engage the power take-off unit thereby closing the power take-off switch 66. Next, one of the console switches 68 or 70 is closed to complete a series circuit from the battery 54 to the coil 78 for the relay 76, thus energizing the relay. As this occurs, the movable contact 80 is drawn from the contact 82 to the contact 84 completing a circuit from the battery to the solenoid 32 to energize the electromagnet assembly and through the diode 30 to the movable switch arm 92 of the control switch 94.

The workman then depresses the accelerator pedal to a maximum foot throttle position. In so doing, the throttle linkage rod 16 is mechanically moved to the left, when viewed in FIG. 1, to swing the lock arm 18 in a counterclockwise direction downward against the top of the electromagnet assembly 12. Since the solenoid is now energized, the lock arm 18 is attracted to and locked against the electromagnet assembly for subsequent movement therewith under the control of the motor 20.

Then, the desired operating speed for the engine may be manually set through adjustment of the mechanical portion of the comparison means 24 illustrated in FIG. 1, as will be hereinafter described. Briefly, however, the mechanical portion of the comparison means 24 functions such that if the operating speed of the engine exceeds the predetermined speed for the engine, the movable switch arm 92 moves to engage the contact 98, as would be the case when the speed regulating apparatus is initially energized. If the operating speed of the engine is less than the predetermined speed, the movable arm 92 moves to engage the contact 96.

Since initially the operating speed of the engine under full throttle condition exceeds the predetermined speed, the movable switch arm 92 moves to the contact 98 to complete a series circuit from the battery 54 through the field winding 50 and armature winding 52 to ground. As previously described, such current flow causes the drive shaft 44 to turn in a second direction producing a clockwise turning of the electromagnetic assembly 12 on the rocker shaft 14. As this occurs, the lock arm 18, being secured to the electromagnet assembly 12, turns the rocker shaft 14 in a clockwise direction to move the throttle linkage rod 16 to the right, when viewed in FIG. 1. Such movement of the throttle linkage rod 16 slows the operating speed of the engine and continues until the operating speed of the engine equals the predetermined desired operating speed for the engine. At that time, the movable switch arm 92 separates from the contact 98 to halt operation of the motor. Thereafter, the operating speed of the motor remains at the value set by the position of the throttle linkage rod 16 until there is a change in the load on the engine.

Such a change in engine load occurs as the auxiliary equipment is connected to the engine through the power take-off unit. In particular, there is a sudden increase in the load on the engine and a reduction in the operating speed of the engine. As the operating speed of the engine decreases, the mechanical portion of the comparison means 24 moves the switch arm 92 to engage the contact 96 thereby completing a series circuit from the battery 54 through the limit switch 26, field winding 48 and armature winding 52 to ground. As previously indicated, such current flow produces a turning of the drive shaft 44 in the first direction to produce a counterclockwise swinging of the electromagnet assembly 12 on the rocker shaft 14. The lock arm 18 is still locked to the electromagnet assembly 12. Thus, such counterclockwise swinging movement of the electromagnet assembly 12 produces a counterclockwise turning of the rocker shaft 14, and a movement of the throttle linkage rod 16 to the left, when viewed in FIG. 1. Such movement of the throttle linkage rod 16 increases the operating speed of the engine to the predetermined value at which time the movable switch arm 92 separates from the contact 96 to maintain the engine speed at the predetermined value. Such automatic correction of the engine speed upon increase in the load on the engine is extremely rapid and in practice there is only a momentary reduction in engine speed from the desired value.

It should be noted in the foregoing operation that with the lock arm 18 secured to the electromagnet assembly 12 and with the electromagnet assembly swinging in a counterclockwise direction to increase the speed of the engine, a point will be reached, as previously described, at which the cantilevered arm 102 engages the stop 104 to open the limit switches 26 and 28. This defines a maximum throttle condition for the engine which is less than the operating speed which might damage the auxiliary equipment connected to the engine through the power take-off unit. Such limit switch control is a particularly important safety feature. For example, should the structure in the comparison means 24 for monitoring the engine's speed fail, it would appear to the speed regulating apparatus 10 that there was a reduction in engine speed and the apparatus would attempt to compensate for it by moving towards a full throttle condition. With the auxiliary equipment connected to the engine through the power take-off unit, increase in the engine speed beyond a certain value would damage the auxiliary equipment. However, because of the inclusion of the limit switches 26 and 28, before the engine can falsely reach a speed which would damage the auxiliary equipment, the limit switches open thereby halting operation of the motor 20 and de-energizing the electromagnet assembly to permit separation of the lock arm therefrom. As this occurs, the accelerator pedal, which is normally spring biased toward an idle condition, functions to mechanically return the engine speed to an idle speed thereby preventing damage to the auxiliary equipment.

The use of the relay 76 is also important in the circuit means 22 to insure that the engine will return to an idle condition whenever the ignition is interrupted. In particular, any time the ignition is interrupted, either by opening of the ignition switch 56 or by actuation of the safety switches 58 or 60, the relay 76 returns to its normal condition de-energizing the electromagnet assembly 12 and allowing separation of the lock arm 18 therefrom. This permits automatic return of the engine to an idle speed under the influence of the accelerator pedal and permits swinging of the electromagnet assembly 12 away from the lock arm 18 to the initial position therefor defined by the limit switches 26 and 28 and the stop member 104. The significance of the relay 76 can be more fully appreciated when it is considered that if a switch were utilized instead of the relay, any time the ignition was interrupted to shut off the motor, the speed regulating apparatus 10 would continue to be energized and move toward a full throttle condition. As the engine's speed slowed due to ignition shut off, the engine could conceivably continue to run due to glowing carbon particles on the spark plug tips even though the spark plugs were not firing. Under certain conditions, particularly wherein it was desired that the auxiliary equipment be shut off, such continued operation could be very undesirable.

The diode 30 also plays a very important role during the shut off of the speed regulating apparatus 10. In particular, to turn off the speed regulating apparatus 10, one of the parallel console switches 68, 70, is opened to open the circuit from the battery 54 to the coil 78 of the relay 76. As this occurs, the movable contact 80 returns to the fixed contact 82 thereby completing a circuit from the battery 54 through the limit switch 26, the field winding 48, and armature winding 52 to ground. Such current flow produces a movement of the drive shaft 40 in the first direction and a counterclockwise swinging of the electromagnet assembly 12. If current from the battery 54 were also allowed to continue to energize the electromagnet assembly 12, this would mean that the operation of the control motor would increase the engine speed and hence possibly damage the auxiliary equipment connected to the power take-off. In the circuit means 22, such feedback current to the electromagnet assembly is blocked by the diode 30. In particular, the electromagnet assembly 12 is not immediately de-energized upon an opening of one of the console switches. During the period of time after the opening of the console switch that the electromagnet assembly 12 is still energized, the lock arm 18 is still locked to the electromagnet assembly and moves therewith in response to operation of the motor 20 in a counterclockwise direction. Thus, there is a momentary increase in the operating speed of the engine producing a movement of the switch arm 92 to the contact 98. Under such conditions, were it not for the diode 30 current would flow from the battery 54 though the field winding 48 and the field winding 50 through the contact 98 and movable switch arm 92 to the solenoid 32 to maintain the electromagnet assembly 12 energized and the lock arm 18 locked thereagainst as the electromagnet assembly continues to swing in a counterclockwise direction. This would create a rapid increase in the operating speed of the engine which might damage the auxiliary equipment connected thereto through the power take-off.

Accordingly, it is appreciated that the limit switches 26 and 28, the relay 76, and the diode 30 play important roles in the safe operation of the engine when under the control of the speed regulating apparatus 10.

To provide the desired control over the operation of the motor 20 and to maintain the speed of the engine at the predetermined speed, the comparison means 24 includes the control switch 94 as well as the mechanical stucture illustrated diagrammatically in FIGS. 1 and 2 for regulating movement of the switch arm 92. In particular, and referring specifically to FIGS. 1 and 2, the switch arm 92 extends radially from a collar 108 supported for free turning on the rocker shaft 14. Thus supported, the end of the switch arm 92 is movable between the fixed contacts 96 and 98 supported in a stationary bracket 110 within the housing for the apparatus 10. The mechanical portion of the comparison means 24 controls movement of the switch arm 92 between the contacts 96 and 98 and, generally speaking, includes means for continuously monitoring the operating speed of the engine, means for selecting a predetermined speed about which the engine speed is to be controlled, and means for mechanically comparing such speeds to move the switch arm in response to the amplitude of any speed difference.

In the illustrated form of the comparison means 24, the means for continuously monitoring the operating speed of the engine comprises a gear 112 located in the transmission associated with the engine. The gear continuously turns at a speed proportional to the operating speed of the engine and is connected by a flexible shaft 114, such as commonly employed to drive a speedometer, through a reduction gear box 116 to a monitoring shaft 118. Due to its connection through the gear box 116, the monitoring shaft 118 also turns at a speed proportional to the operating speed of the engine.

The means for selecting a predetermined speed about which the engine speed is to be controlled comprises a selector unit 120 here illustrated as comprising a selector switch 122 supported for swinging movement on a pivot 124 with one end connected to a push rod 126 and one end exposed for manual control. The selector unit 120 is designed such that the position of the selector lever 122 corresponds to various predetermined speeds about which it is desired to regulate the operating speed of the engine. For example, a vertical position of the selector lever may correspond to a predetermined intermediate speed while the left-most position, as viewd in FIG. 1, may correspond to a maximum predetermined speed and the right-most position to a minimum predetermined speed. Of course, a multitude of intermediate predetermined speeds exist between the left and right positions for the selector lever.

The means for mechanically comparing the operating speed of the engine with the predetermined speed and for moving the switch arm 92 in response to the amplitude of any speed difference comprises a cylindrical slide member 128 stationed on the monitoring shaft 118 with a pin 130 connected to the collar 108 such that axial sliding movement of the slide along the monitoring shaft produces a swinging motion of the switch arm 92 between the contacts 96 and 98.

In addition to the slide 128, the mechanical means includes means for converting the operating speed of the engine and the predetermined speed into opposing forces acting on the right and left ends of the slide 128 respectively. When the opposing forces are balanced, that is, when the operating speed of the engine corresponds to the predetermined speed, the slide 128 is in a so-called "balanced position" along the monitoring shaft 118 and the switch arm 92 is spaced from the contacts 96 and 98. However, when the operating speed of the engine is greater than the predetermined speed, the force corresponding to the operating speed of the engine exceeds the force corresponding to the predetermined speed and the slide 128 moves to the left on the monitoring shaft to swing the switch arm 92 against the contact 98. This completes a series circuit from the battery 54 through the field winding 50 and armature winding 52 to ground to turn the drive shaft 44 of the motor 20 in a direction which will produce a slowing of the engine to the predetermined speed. As that occurs, the forces acting on opposite ends of the slide 128 are again balanced and the slide assumes its balanced position along the monitoring shaft to move the switch arm 92 from the contact 98. Similarly, should the operating speed of the engine drop below the predetermined speed, the force corresponding to the predetermined speed exceeds the force corresponding to the engine operating speed and the slide 128 moves to the right. As this occurs, the switch arm 92 swings to the contact 96 to complete a series circuit from the battery 54 through the field winding 48 and armature winding 52 to ground. Such current flow produces a turning of the motor drive shaft 44 in a direction to increase the operating speed of the engine until it reaches the predetermined speed. The opposing forces acting on the slide 128 then again balance and the slide assumes the balanced position along the monitoring shaft to swing the switch arm 92 from the contact 96.

The means for converting the operating speed of the engine into a force acting on the right side of the slide 128 includes a pair of governor weights 132 and 134 pivotally connected on diametrically opposite sides of the monitoring shaft 118 to ends of a support member 136 for swinging movement toward and away from the monitoring shaft 118. The support member 136 is fixedly secured to the monitoring shaft for turning therewith such that footlike projections 133 and 135 from the governor weights 132 and 134 respectively bear against the right end of the slide 128. As the speed of the monitoring shaft 118 increases with an increase in the operating speed of the engine, the governor weights 132 and 134 swing outwardly to urge the slide 128 to the left while reductions in the rotational speed of the monitoring shaft and hence in the operating speed of the engine produce an inward swinging of the governor weights permitting the slide to move to the right. In this manner, the governor weights function to convert the magnitude of the operating speed of the engine into a force on the right side of the slide 128 urging the slide to the left along the monitoring shaft 118.

The means for converting the predetermined speed into a force acting on the left end of the slide 128 comprises a coil spring 138 receiving a left end portion of the monitoring shaft 118 and extending between the left side of the slide and a control arm 140. The control arm 140 includes a head portion 142 for loosely receiving and sliding along the left end of the monitoring shaft 118 against the coil spring 138, and a foot portion 144 supported for sliding movement in the direction of the monitoring shaft. The control arm 140 is connected to the push rod 126 such that movebent of the selector switch 122 produces a movement of the control arm 140. In particular, movement of the top of the selector lever 122 towards the left produces a movement of the control arm 140 to the left along the monitoring shaft 118 to relax the compression in the coil spring 138 bearing against the left side of the slide 128. Movement of the top of the selector lever to the right produces a movement of the control arm 140 to the right to increase the compression in the coil spring 138 against the left end of the slide member 128. Since the position of the selector lever 122 corresponds to various predetermined speeds, the compression of the coil spring 138 produced upon movement of the selector lever to the various positions and hence the force developed on the left end of the slide member toward the governor weights also corresponds to the various predetermined speeds. For example, the higher compression of the coil spring 128 and the greater the force exerted to the right on the left end of the slide 128, the higher predetermined speed, while the lower compression of the coil spring and the lower the spring force acting on the slide, the lower the predetermined speed. Stated differently the higher the predetermined speed setting, the greater the spring force acting on the slide 128, the greater the governor force required to balance the spring force and hence the greater the operating speed of the engine to move the slide to the balanced position along the monitoring shaft. In fact, by definition, the balanced position is reached only when the operating speed equals the predetermined speed. The same is true when the predetermined speed is of a low value meaning that the spring force exerted on the slide member is of a reduced value. Under such conditions, the force which the governor weights must develop on the slide 128 to move the slide to a balanced positon is much less and requires a lesser engine operating speed to produce such a balancing force. Again, by definition, the balancing condition occurs when the operating speed equals the predetermined speed.

During the operation of the comparison means 24, and as described above, the forces compressing the coil spring 138 may very rapidly. Under such conditions, the coil spring 138 also reacts rapidly and in fact may tend to over react to a change in the operating speed of the engine. For example, in response to a sudden increase in the operating speed of the engine and an increase in the force developed by the governor weights on the slide 128, the coil spring 138 by itself may tend to over compress and commence oscillating to move the slide member back and forth along the monitoring shaft 118. Such a result is of course undesirable. To prevent such over reaction of the coil spring 138 and to insure against undesired oscillation thereof, a sleeve 146 of a resilient material such as foam rubber is stationed around the monitoring shaft within the coil spring 138. The foam rubber serves to dampen the reaction time of the spring 138 and thereby prevents its over action and oscillation during operation of the comparison means 24.

In view of the foregoing, it is appreciated that the present invention provides apparatus for automatically regulating the operating speed of an engine closely about predetermined values independent of changes in the load applied thereto through a power take-off unit. In this manner, the present invention eliminates the need for extra workmen to visually monitor and manually control engine speed and reduces the changes of auxiliary equipment damage due to excessive engine operating speed.

I claim:

1. In combination with a vehicle's engine for driving auxiliary equipment through a selectively operable power take-off from said engine, adjustable apparatus for automatically regulating the speed of said engine under varying load conditions comprising:

a rocker shaft;

means connected to said rocker shaft for movement upon a turning of said rocker shaft to control the operating speed of said engine;

a lock arm connected to said rocker shaft and extending radially therefrom to turn said rocker shaft upon a swinging of said lock arm;

an electromagnet assembly including a solenoid connected for free swinging on said rocker shaft and for selectively locking said lock arm to said electromagnet assembly for swinging movement therewith when energized;

a reversible control motor including a drive shaft for turning in first and second directions;

means connecting said drive shaft to said electromagnet assembly to swing said assembly in counterclockwise and clockwise directions on said rocker shaft in response to turning of said drive shaft in said first and second directions;

electrical circuit means for energizing said control motor and said electromagnet assembly upon engagement of said power take-off and including a battery for said engine, a switch in series with said battery and operable upon engagement of said power take-off, and a relay including a coil in series with said battery through an ignition for said engine, a movable contact connected to said battery, and a first fixed contact connected to said solenoid and to said control motor; and means for comparing the operating speed of said engine to a selectively adjustable predetermined speed and for regulating the direction of rotation of said drive shaft to turn in said first direction when the operating speed of said engine is less than said predetermined speed and in said second direction when the operating speed of said engine is greater than said predetermined speed.

2. The apparatus of claim 1 wherein:

said control motor is a series motor and comprises a movable armature connected to said drive shaft, and first and second field windings in series circuit with an armature winding such that current flow through said first field and armature windings produces a turning of said drive shaft in said first direction and current flow through said second field and armature windings produces returning of said drive shaft in said second direction;

said means for comparing the operating speed of said engine with said predetermined speed comprises a switch including second and third fixed contacts connected to said first and second field windings respectively, a switch arm in series circuit with said first fixed contact and movable between said second and third fixed contacts, and means for moving said switch arm to engage said second contact when said engine speed is less than said predetermined speed and for moving said switch arm to engage said third contact when said engine speed is greater than said predetermined speed; and said apparatus further comprises first and second limit switches on said electromagnet assembly in series circuit with said first field winding and said second fixed contact, and in series circuit with said solenoid respectively, and stop means adjacent said electromagnet assembly for engaging and opening said first and second limit switches when said electromagnet assembly reaches a predetermined rotational position on said rocker shaft.

3. The apparatus of claim 2 wherein said relay further includes a fourth fixed contact connected in series with said first limit switch and said first field winding for engaging said movable contact when said relay is de-energized.

4. The apparatus of claim 3 wherein said circuit means further includes diode means in series circuit with said first fixed contact and said switch arm for conducting current from said battery to said switch arm.

5. Selectively adjustable apparatus for automatically regulating the speed of an engine under varying load conditions comprising:
  a rocker shaft;
  means connected to said rocker shaft for movement with a turning of said rocker shaft to control the operating speed of said engine;
  a lock arm connected to said rocker shaft and extending radially therefrom to turn said rocker shaft upon a swinging of said lock arm;
  an electromagnet assembly including a solenoid connected for free swinging on said rocker shaft and for selectively locking said lock arm to said electromagnet assembly for swinging movement therewith when energized;
  a series motor comprising a rotatable armature connected to a drive shaft, and first and second field windings in series circuit with an armature winding such that current flow through said first field and armature windings produces a turning of said drive shaft in a first direction and current flow through said second field and armature windings produces a turning of said drive shaft in a second direction;
  means connecting said drive shaft to said electromagnet assembly to swing said assembly in counterclockwise and clockwise directions on said rocker shaft in response to turning of said drive shaft in said first and second directions;
  electrical circuit means for energizing said series motor and said electromagnet assembly and comprising a battery, a relay including a coil in series with said battery, a movable contact connected to said battery, a first fixed contact connected to said solenoid, a second fixed contact connected to said first field winding, and diode means connected to said first fixed contact for conducting current from said battery through said first fixed contact; and
  means for comparing the operating speed of said engine with a selectively adjustable predetermined speed comprising a switch including third and fourth fixed contacts connected to said first and second field windings, respectively, a switch arm in series circuit with said diode means and movable between said third and fourth contacts, and means for moving said switch arm to engage said third contact when said engine speed is less than said predetermined speed and for moving said switch arm to engage said fourth fixed contact when said engine speed is greater than said predetermined speed.

6. The apparatus of claim 5 further including:
  first and second limit switches carried by said electromagnet assembly, said first limit switch being connected in series circuit with said first field winding and to a junction of said third fixed contact and said diode means and said second limit switch being connected in series with said solenoid; and
  stop means adjacent said electromagnet assembly for engaging and opening said first and second limit switches when said electromagnet assembly reaches a predetermined rotation of position on said rocker shaft.

7. The apparatus of claim 5 wherein said means for comparing the operating speed of said engine with a selectively adjustable predetermined speed and said means for moving said switch arm included therein comprises:
  means for continuously monitoring the operating speed of said engine and for turning a monitoring shaft at a speed proportional to said operating speed of said engine;
  a slide member supported for longitudinal sliding movement along said monitoring shaft;
  a support member connected to and carried by said monitoring shaft for turning therewith;
  a governor weight pivotally connected to said support member for swinging movement toward and away from said monitoring shaft and including a projection for engaging a first end of said slide to urge said slide in a first direction upon outward swinging movement of said governor weight and to permit movement of said slide in a second direction along said monitoring shaft with inward swinging movement of said governor weight;
  a coil spring around said monitoring shaft and bearing against a second end of said slide for continuously urging said slide in said second direction;
  a control arm bearing against an end of said coil spring remote from said slide to compress said coil spring between said arm and said slide;
  means for moving said control arm along said monitoring shaft to control the compression of said coil spring in accordance with various preselected speeds;
  dampening means around said monitoring shaft and within said coil spring for dampening the expansion and contraction of said coil spring with movement of said slide member along said monitoring shaft in response to swinging movement of said governor weight produced by variation in the operating speed of said engine; and
  means connecting said slide to said switch arm.

References Cited

UNITED STATES PATENTS

| | | | |
|---|---|---|---|
| 2,842,110 | 7/1958 | Eddy | 123—102 |
| 3,090,460 | 5/1963 | Teetor | 123—102 |
| 3,183,994 | 5/1965 | Goerke et al. | 123—102 |
| 3,322,226 | 5/1967 | Marshall et al. | 123—102 |
| 3,381,771 | 5/1968 | Granger et al. | 123—102 |

C. J. HUSAR, Primary Examiner